(12) United States Patent
Rollet

(10) Patent No.: US 10,715,284 B2
(45) Date of Patent: Jul. 14, 2020

(54) REQUESTING RETRANSMISSION OF DATA IN A MULTICAST NETWORK

(71) Applicant: MITSUBISHI ELECTRIC CORPORATION, Tokyo (JP)

(72) Inventor: Romain Rollet, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 18 days.

(21) Appl. No.: 16/087,421

(22) PCT Filed: May 29, 2017

(86) PCT No.: PCT/JP2017/020733
§ 371 (c)(1),
(2) Date: Sep. 21, 2018

(87) PCT Pub. No.: WO2017/209308
PCT Pub. Date: Jul. 12, 2017

(65) Prior Publication Data
US 2019/0109678 A1 Apr. 11, 2019

(30) Foreign Application Priority Data

Jun. 3, 2016 (EP) .................................... 16305653

(51) Int. Cl.
*H04L 1/18* (2006.01)
*H04L 1/16* (2006.01)
(Continued)

(52) U.S. Cl.
CPC .............. *H04L 1/1896* (2013.01); *H04L 1/16* (2013.01); *H04L 1/1838* (2013.01);
(Continued)

(58) Field of Classification Search
None
See application file for complete search history.

(56) References Cited

U.S. PATENT DOCUMENTS

| 6,381,215 B1 | 4/2002 | Hamilton et al. |
| 2003/0009717 A1 | 1/2003 | Fukushima et al. |

(Continued)

FOREIGN PATENT DOCUMENTS

| EP | 0969623 A2 | 1/2000 |
| JP | 2001-119437 A | 4/2001 |

(Continued)

OTHER PUBLICATIONS

Office Action dated Jun. 4, 2019 issued in counterpart Japanese Application No. 2018-539176 with an English Translation.

*Primary Examiner* — Mohammad S Adhami
(74) *Attorney, Agent, or Firm* — Birch, Stewart, Kolasch & Birch, LLP

(57) ABSTRACT

The invention relates to a method of requesting retransmission of a lost data packet initially transmitted by a multicast transmitter in a network, the multicast transmitted multicasting data packets in the network, said method being carried out by a first multicast receiver and comprising the following steps:
  upon detection (201) of a loss of at least one data packet on a data link between the multicast transmitter and the first multicast receiver, setting (206) a timer value and arming (207) a timer;
  upon detection (208) that the timer reaches the set timer value, sending (209) a non-acknowledgment message to the multicast transmitter via an uplink control link, said non-acknowledgment message comprising an identifier of at least one lost data packet, if it has not been previously retransmitted by the multicast transmitter.

15 Claims, 8 Drawing Sheets

(51) Int. Cl.
 H04N 19/114 (2014.01)
 H04L 5/00 (2006.01)
 H04L 1/00 (2006.01)

(52) U.S. Cl.
 CPC .......... H04L 1/1848 (2013.01); H04L 1/1851 (2013.01); H04L 1/1887 (2013.01); H04L 5/0055 (2013.01); H04N 19/114 (2014.11); H04L 2001/0093 (2013.01)

(56) References Cited

U.S. PATENT DOCUMENTS

| | | | | |
|---|---|---|---|---|
| 2008/0256409 | A1* | 10/2008 | Oran | H04L 1/1867 714/748 |
| 2013/0250837 | A1* | 9/2013 | Shiotani | H04W 4/06 370/312 |
| 2016/0094356 | A1* | 3/2016 | Xiang | H04L 12/1868 370/390 |
| 2017/0012742 | A1* | 1/2017 | Zhu | H04L 1/1883 |
| 2018/0295555 | A1* | 10/2018 | Xiong | H04L 47/196 |

FOREIGN PATENT DOCUMENTS

| | | |
|---|---|---|
| WO | WO 02/073882 A2 | 9/2002 |
| WO | WO 2004/002048 A1 | 12/2003 |

\* cited by examiner

REQUESTING RETRANSMISSION OF DATA IN A MULTICAST NETWORK

TECHNICAL FIELD

The present invention generally relates to retransmission of multicast data packets, in particular in video streaming applications.

BACKGROUND ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Multicasting is a technology that is widely spread, especially for video streaming, such as Internet Protocol Tele-Vision (IPTV).

Multicasting avoids bandwidth waste that would be induced by the aggregation of unicast data flows towards the receivers.

In wireless networks, multicast data packets are generally emitted in a robust and conservative mode by the physical layer because packets shall be received by any subscribers of the multicast data flow, and because packets cannot be retransmitted by a MAC retransmission scheme.

Contrary to unicast data packets, multicast data packets are emitted in Non-Acknowledged mode, which means that the receiver will not send an acknowledgment upon reception of a data packet.

A robust transmission by the physical layer can also be chosen because the transmitter has less information about reception condition in the receivers. Therefore, it is really difficult to implement an efficient link adaptation mechanism as it may exist for example for unicast traffic.

However, even by using a very robust physical mode, some packet losses may occur because of radio channel variation and shadowing effect.

Such packet losses are particularly common with small hand devices such as smartphones or touch panels for example.

The packet losses are detrimental to the quality of the video displayed to the user, because they are translated into audio and video artefacts.

For those reasons, there is a need to introduce an efficient repetition mechanism for multicast video data flows to improve the audio/video quality experienced by the user.

In video coding, a codec arranges the pictures as a succession of intra- and inter-frames.

A Group Of Pictures, GOP, is a group of successive pictures within a coded video flow. A GOP can contain the following frame types:
- I-frame, or intra-coded frame, which is a picture that is coded independently of all other pictures or frames. Each GOP starts with an I-frame;
- P-frame, or predictive coded frame, contains motion-compensated difference information relative to previously decoded I or P frames;
- B frame, or bi-predictive coded frame, contains motion-compensated difference information relative to previously and future decoded frames. B frames are generally not used as reference frames in order to avoid propagating errors.

In a preferred implementation, the multicast data link can be transported over the IETF RTP (Real-time Transport Protocol) protocol. Even if HTTP (HyperText Transport Protocol) protocol is often used for video transmission, in particular for Internet streaming and Universal Plug and Play, UPnP, applications, this protocol is not adapted because it relies on TCP that is not compatible with multicasting. On the contrary, IPTV relies on IETF RTP over UDP protocol for data transport.

Data transport can be augmented by a control protocol such at Real-time Transport Control Protocol, RTCP, to allow monitoring of data delivery in a manner that is scalable to large multicast networks, and to provide minimal control and identification functionalities.

RTP and RTCP are standardized in IETF RFC 3550.

RTCP is also extended by IETF RFC 4585 in order to support messages for immediate feedback of the receivers, in particular negative acknowledgment, NACK, messages. In RFC 6642, a new message called "Third Party Loss Report" TPLR is introduced to mitigate the number of NACK messages induced when multiple receivers experience the same packet losses. A "feedback storm" troublesome effect may also generate collisions in wireless networks. There are therefore needs to design mechanism to avoid it.

The transmission of multimedia streams often relies on the RTP/RTCP protocols that are widely used, in particular for IPTV appliance.

Unlike HTTP, RTP/RTCP data streams are conveyed over UDP datagrams, and thus, delivery and packet ordering is not guaranteed. However, UDP datagrams can be multicast over wired or wireless networks.

In 802.11 (Wi-Fi) wireless networks, multicast flows can be transmitted in the same way as broadcasted flows: they are sent by an application provider AP without any acknowledgment policy (NoAck policy) and using a physical layer mode that is compatible with any receiver. As multicast data packets are not repeated, the physical layer mode is very conservative in order to ensure good reception for most of the receivers, even in case of bad radio conditions.

However, a conservative physical layer mode is not sufficient to deal with shadowing effects or fast radio channel changes.

Unlike Video-on-Demand (VoD) applications, live video streaming receivers do not support long buffering. Short buffers, coupled with the multiplicity of receivers, prevent from using retransmission schemes.

Audio/video decoders are resilient to data errors, but it leads to video frames dropping and/or video/audio artefacts.

Burst of packet losses due to the wireless network can have a huge impact on audio/video quality, especially when lost packets convey I-frame. Indeed, in that case, all the GOP will be impacted and numerous artefacts will be visible during several seconds.

SUMMARY OF INVENTION

Technical Problem

Thus, there are needs for an efficient and robust retransmission method in the context of a multicast data stream.

Solution to Problem

To address at least some of these needs, a first aspect of the invention concerns a method of requesting retransmission of a lost data packet initially transmitted by a multicast transmitter in a network, the multicast transmitter multicasting data packets in the network, the method being carried out by a first multicast receiver and comprising the following steps:

upon detection of a loss of at least one data packet on a data link between the multicast transmitter and the first multicast receiver, setting a timer value and arming a timer;

after the timer reaches the set timer value, sending a non-acknowledgment message to the multicast transmitter via an uplink control link, the non-acknowledgment message comprising an identifier of at least one lost data packet, if it has not been previously retransmitted by the multicast transmitter.

Setting a timer before sending the NACK message enables to avoid unnecessarily overloading the network. Indeed, in a multicast system, it is likely that other receivers have experienced to same losses. This is even more critical in the context of a wireless multicast. Therefore, before the timer expires it is possible to receive the missing data packet because it has been previously requested by another multicast receiver. Alternatively, it is possible to receive a loss information message indicating that the lost data packet will be retransmitted in multicast (to all the receivers), because several receivers have requested it for retransmission.

According to some embodiments of the invention, the data packets can be ordered by sequence numbers and the lost data packet can be detected by receiving a data packet having a sequence number that is not contiguous with the highest sequence number of an already received packet.

This enables to determine quickly the loss of a packet and therefore to make the retransmission request more efficient.

As a complement, the first multicast receiver can maintain a reception window having a bottom of window and an end of window, the bottom of window can be the lowest sequence number among sequence numbers of the at least one lost packets and the end of window can be the highest sequence number of an already received data packet plus one.

Maintaining a reception window enables to receive out-of-order packets and therefore limits the number of data packets requested for retransmission.

Still in complement, upon reception of a first data packet having a sequence number corresponding to the bottom of window, the first data packet and received contiguous data packets are transmitted to an application unit and the bottom of window is updated.

This enables to continuously update the reception window and to process the data stream on the fly.

Still in complement, if the bottom of window is equal to the end of window, the timer can be deactivated.

This enables to limit the processing resources consumed by the first multicast receiver.

According to some embodiments, upon detection of a loss of at least one data packet, the first multicast receiver can determine whether the lost data packet is a single packet loss based on a filling ratio of the reception window and respective states of preceding and next data packets. Upon determination of a single packet loss, the timing value can be divided by a predetermined factor.

This enables to enhance the efficiency of the retransmission requesting method. According to some embodiments, the non-acknowledgment message comprises identifiers of all the lost packet or packets of the reception window. According to some embodiments, the method can further comprise, upon detection that a set of data packets of the reception window is associated with respective elapsed timestamps:

transmitting the set of data packets to an application unit;

discarding the set of data packets from the reception window, and updating the reception window.

This enables to resynchronize the reception window without decreasing too much the audio/video quality. Indeed, the application unit can implement resilient video or audio encoding and may use the available information even if some data packets are missing.

According to some embodiments, the timer value is randomly drawn by the multicast receiver in a range between a minimum value and a maximum value.

This enables to avoid time conflicts between NACK messages transmitted by other multicast receivers, as it decreases the probability that two NACK messages are sent to the multicast transmitter at the same time.

As a complement, the minimum value is calculated based on a mean inter-packet time of n last data packets received by the multicast receiver, n being an integer greater than or equal to one.

This enables to ensure that at least one next data packet is received by the first multicast receiver before the NACK message is sent to the multicast transmitter, the next data packet potentially being one of the lost data packet to be requested for retransmission in the NACK message.

According to some embodiments, the data packets can be decoded by the first multicast receiver to build video/audio frames and the maximum value can be set based on a difference between a first presentation timestamp value of a frame corresponding to the data packet of the bottom of window, and a second presentation timestamp value of a currently played frame.

This enables to ensure that the retransmitted data packets are received before the content they carry is to be displayed. Therefore, the video/audio quality is improved.

According to some embodiments, the first multicast receiver can further receive a loss report message on a multicast downlink control link from the multicast transmitter, the loss report message identifying data packets to be retransmitted by the multicast transmitter in association with a transmission mode among the unicast mode and the multicast mode. If a given data packet is identified to be retransmitted in multicast mode and if the given data packet belongs to the detected at least one lost data packet, then the non-acknowledgment message does not comprise the identifier of the given data packet.

This enables to avoid sending unnecessary NACK messages for data packets that are already scheduled for retransmission in multicast. This reduces the network load.

According to some embodiments, the multicast receiver can further receive a loss report message on a multicast downlink control link from the multicast transmitter, the loss report message identifying data packets to be retransmitted by the multicast transmitter in association with a transmission mode among the unicast mode and the multicast mode. If a given data packet is identified to be retransmitted in unicast mode and if the given data packet belongs to the detected at least one lost data packet, then the non-acknowledgment message comprising at least the identifier of the given data packet can be transmitted to the multicast transmitter without waiting for the timer to reach the set timer value.

This enables to indicate to the multicast transmitter that the first receiver also misses the given data packet. In reaction to this, the multicast transmitter can decide to change the retransmission mode of the given data packet to transmit it in multicast mode, therefore increasing the efficiency of the method.

According to some embodiments, the data packets can be decoded by the first multicast receiver to build video/audio frames and the first multicast receiver can further receive a content information message on a multicast downlink control link from the multicast transmitter, the content information message associating each data packet with a frame type of video/audio frame among the following types: intra-coded frame, audio frame, predictive coded frame, bi-predictive coded frame. For each lost packet among the at least one detected lost packet, the associated frame type can be determined by the multicast receiver based on the content information message. The lost data packets identified in the non-acknowledgment message are prioritized based on their respective associated frame types.

This enables to prioritize retransmissions of data packets which have a heavy impact on the audio/video quality.

A second aspect of the invention concerns a computer program product comprising a computer readable medium having stored thereon computer program instructions loadable into a computing device and adapted to—when loaded into and executed by said computing device—cause the computing device to perform the steps of a method according to the first aspect of the invention.

A third aspect of the invention concerns a multicast receiver for requesting retransmission of a lost data packet initially transmitted by a multicast transmitter in a network, the multicast transmitter multicasting data packets in the network, the multicast receiver comprising a processor arranged for:
  detecting loss of at least one data packet on a data link between the multicast transmitter and the first multicast receiver,
  upon detection of the loss, setting a timer value and arming a timer;
  after the timer reaches the set timer value, sending a non-acknowledgment message to the multicast transmitter via a network interface of the multicast receiver and on an uplink control link, said non-acknowledgment message comprising an identifier of at least one lost data packet, if it has not been previously retransmitted by the multicast transmitter.

A fourth aspect of the invention concerns a system comprising at least one multicast receiver according to the third aspect of the invention and a multicast transmitter.

The present invention is illustrated by way of example, and not by way of limitation, in the figures of the accompanying drawings, in which like reference numerals refer to similar elements.

DESCRIPTION OF EMBODIMENTS

Figure 1:
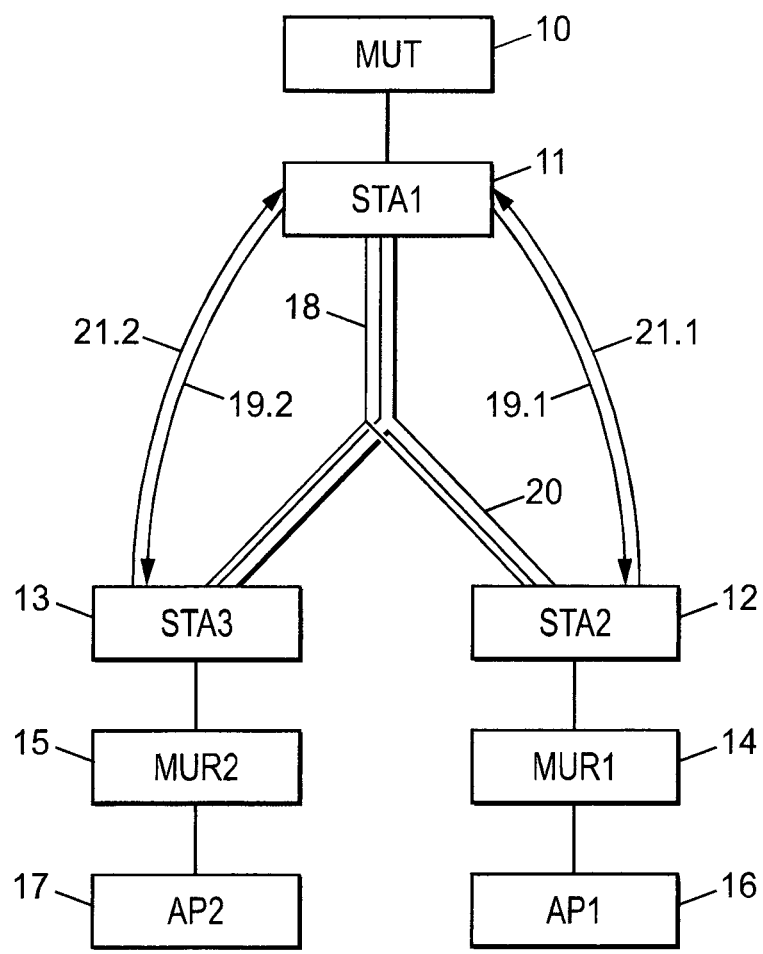
FIG. 1 represents a multicast system according to some embodiments of the invention.

FIG. 1 illustrates a system according to an embodiment of the invention.

The system comprises a multicast transmitter 10 that can access to multicast contents to be transmitted to receivers. To this end, the multicast transmitter 10 is connected to a first station 11, such as a wireless station (for example an 802.11 station), which can be viewed as an external interface of the multicast transmitter 10.

In the present invention, data packets represent audio/video frames of an audio/video multimedia content. Data packets are sent by the multicast transmitter 10 to a first multicast receiver 14, via a second station 12, and to a second multicast receiver 15 via a third station 13.

For the transmission of the multimedia content, the present invention may introduce:
  one unidirectional multicast data link 18 for data transmission and for retransmission;
  n unidirectional unicast data links 19.1-19.2 for retransmission purpose, n being the number of multicast receivers (2 in the example shown on FIG. 1);
  one unidirectional multicast control link 20 (downlink) for transmission of CONTENT-INFO messages, which are new messages that will be described hereafter;
  n unidirectional control links 21.1-21.2 (uplink) for transmission of feedback messages.

Therefore, the retransmission scheme can retransmit data packets whether in unicast mode, via the data links 19.1-19.2, or in multicast mode, via the unidirectional multicast data link 18.

The multicast receivers 14 and 15 can deliver the received packets to respective application units 16 and 17, which are configured to extract video-audio frames from the data packets so as to render it to a user (for example on a display unit such as a screen).

To this end, the data packets transmitted to the applications 16 and 17 are in-order data packets, without any loss, except when a presentation time stamp indicated in a header of one of the data packets has elapsed. In that case, the data packets with expired timestamp are delivered to their respective application units and are discarded by the multicast receivers. Indeed, the application unit can implement resilient video or audio encoding and may use the available information even if some parts are missing. Then, the multicast receiver can try to resynchronize to a next intra coded video frame.

To transmit in-order packets, the multicast receivers 14 and 15 can maintain a reception window, which will be described hereafter.

In a preferred embodiment, the data links 18, 19.1 and 19.2 are transported over the IETF RTP protocol. However, no restriction is attached to the protocols used in the present invention.

The control links 20, 21.1 and 21.2 can be transported over the IETF RTCP protocol, optionally by extending it with a new packet type called "content information message" hereafter.

Retransmission of data packets can be performed over the multicast data link 18 or over some of the unicast data links 19.1 and 19.2, depending for example on the importance of the audio/video frame transported by the data packet, and/or depending on the number and distributions of lost packets to be retransmitted.

Usage of the data multicast link 18 for retransmission allows saving bandwidth when several receivers missed the same data packet, and also enforce transmission robustness. Thus, multicast retransmission is preferably used when all the receivers or a high percentage of the receivers have experiences the same losses of data packets. For instance, in the case of a Wi-Fi cell, if the considered Wi-Fi cell is installed within a transport vehicle such as a bus or a tramway, the multicast receivers may suffer from perturbations caused by fixed Wi-Fi cell.

Usage of the unicast data links 19.1 and 19.2 for retransmission is more efficient when only one multicast receiver or few multicast receivers experience some errors, as it is less costly in terms of bandwidth because a physical layer transmission mode adapted to the receiver can be selected.

The multicast control link 20 can be used by the multicast transmitter 10 to transmit different control messages, such as loss report messages and content information messages.

Loss report messages (for example, TPLR messages as previously introduced) may indicate identifiers of data packets that have already been requested for retransmission by at least one multicast receiver. In addition, loss report messages can indicate the mode of retransmission, for each identified data packet, selected by the multicast transmitter 10, among the multicast mode and the unicast mode.

The content information messages can be transmitted periodically by the multicast transmitter 10, and they indicate audio/video frame information in association with sequence numbers of data packets. Audio/frame information comprises the frame type among the audio frame type, the intra-coded frame type, the predictive frame type and the bi-predictive frame type.

The content information message may also optionally comprise transmission window state of the multicast transmitter 10, such as lower and higher sequence numbers and associated time stamps. As explained hereafter, this information is useful for the multicast receivers to discard data packets when too many errors have occurred, and to request with a higher priority data packets carrying audio frames and video intra coded frames.

As detailed hereafter, the multicast receivers 14 and 15 are in charge of selecting the data packets requested for retransmission.

Figure 2:
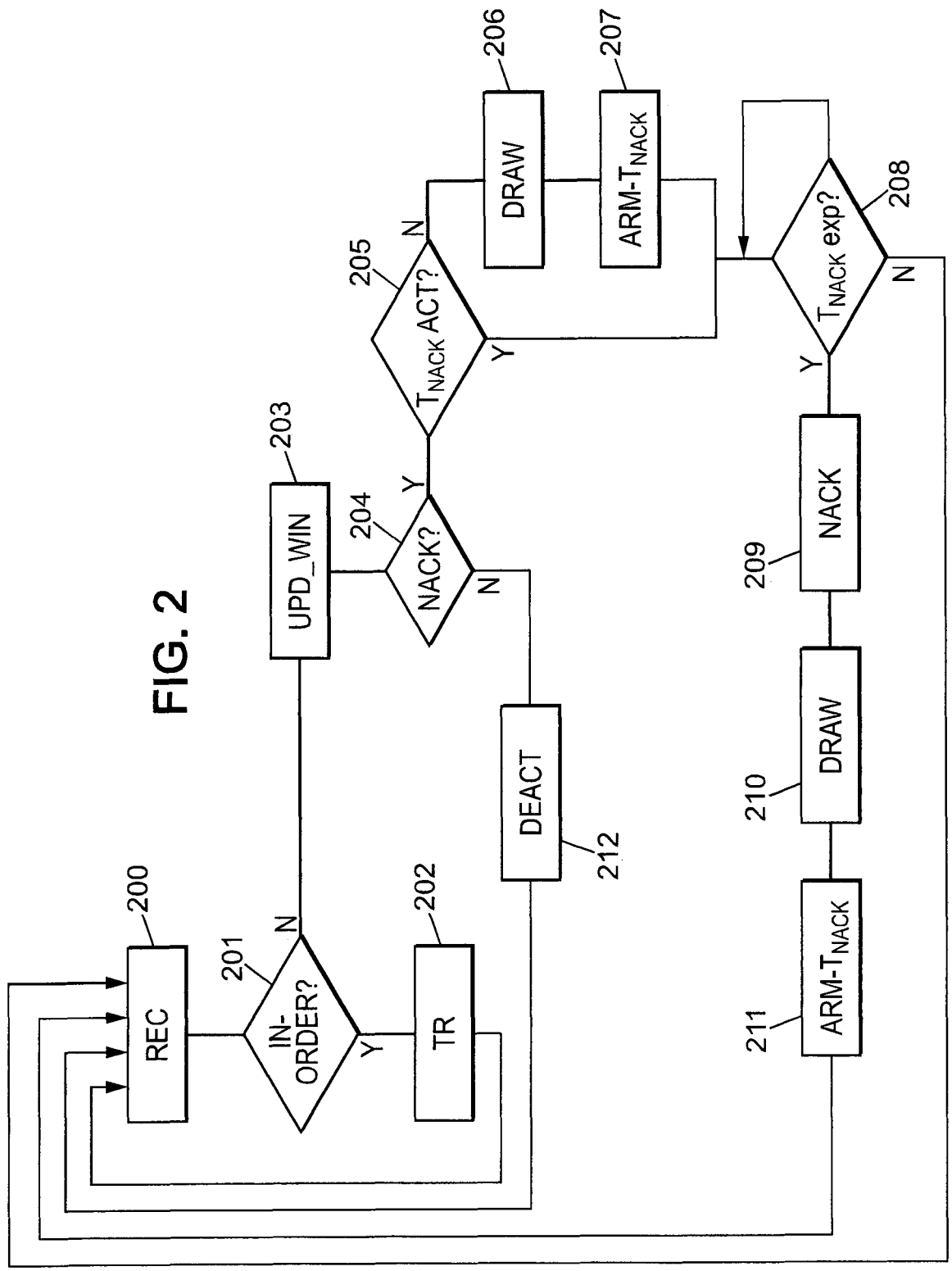
FIG. 2 is a flowchart illustrating a method for requesting retransmission of data packets according to some embodiments of the invention.

FIG. 2 is a flowchart illustrating the steps of a method of requesting retransmission according to some embodiments of the invention. The method is carried out in one of the multicast receivers 14 and 15.

At step 200, a data packet is received from the multicast transmitter 10 via the multicast data link 18. The received data packet can be identified by a sequence number, for example in a header of the data packet.

At step 201, the multicast receiver determines whether all the packets are in-order (meaning that the reception window is empty) and whether the sequence number of the received packet is contiguous to the sequence number of the previously received data packet.

If so, the data packet is forwarded to the application unit 16 or 17 at step 202.

Else, the reception window is updated based on the received data packet at step 203.

Figure 3:
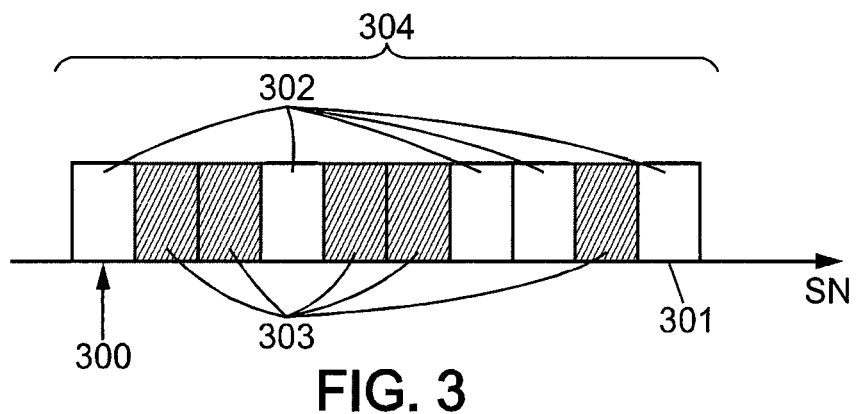
FIG. 3 illustrates a reception window of a multicast receiver according to some embodiments of the invention.

FIG. 3 illustrates a reception window of a multicast receiver according to some embodiments of the invention.

The reception window 304 enables to identify sequence numbers of received packets 303 not yet transmitted to the application unit and of missing or lost packets 302. The reception window 304 can therefore be viewed as a pool of memory that can store data packets with non-contiguous sequence numbers SN, while lost data packets have not been received.

When the reception window is empty, a lost data packet can be identified when a data packet is received out-of-order, i.e. when the received data packet is not contiguous to the last packet transmitted to the application unit.

The reception window 304 comprises a bottom of window 300 that corresponds to the lowest sequence number of the lost data packets 302, and an end of window 301 that corresponds to the highest sequence number of the received data packets plus one.

The update of the reception window 304 at step 203 consists in adding the newly received data packet in the reception window and recalculating the bottom of window 300 or the end of window 301. For example, if the received data packet corresponds to the bottom of window 300, all contiguous received data packets are transmitted to the application unit 16 or 17 and the bottom of window 300 is updated to the sequence number of the next lost data packet of the reception window 304.

At step 204, it is checked whether at least one data packet is lost, meaning that the reception window is not empty.

If not, then no data packet is missing after the update of step 203, meaning that the reception window is empty and that the end of window 301 is equal to the bottom of window 300. Therefore, a timer, that will be described hereafter, is deactivated at step 212 and the method goes back to step 200 for receiving a new data packet.

If the reception window is not empty, then it is checked at step 205 whether the timer is active (is armed) or not.

A timer is used according to the present invention. For example, the timer starts at the value 0 and then reaches the timer value $T_{NACK}$.

If the timer is already armed, the method goes directly to step 208 described hereafter.

Else, the timer value $T_{NACK}$ is set (or drawn) at step 206. The timer value $T_{NACK}$ can be prefixed. However, according to advantageous embodiments of the invention, the timer value $T_{NACK}$ is randomly drawn at step 206. For example, $T_{NACK}$ can be drawn in a range $[T_{Min}; T_{Max}]$ between a minimum value $T_{Min}$ and a maximum value $T_{Max}$.

At step 207, the timer is armed (activated).

At step 208, it is checked whether the timer has reached the timer value $T_{NACK}$ or not. The arrow exiting from the right angle of step 208 on FIG. 2 on entering again step 208 shows that step 208 is a continuous step. The timer is actually checked continuously until a new packet is received at step 200 or until the timer value $T_{NACK}$ is reached.

If not, then the method goes back to step 200 until a new data packet is received from the multicast transmitter.

Else, if the timer has reached the timer value $T_{NACK}$, a non-acknowledgment message is sent at step 209 to the multicast transmitter via the uplink control link 21.1 or 21.2, the non-acknowledgment message comprising an identifier of the at least one lost data packet of the reception window 304. The non-acknowledgment message may also comprise all the identifiers of all the missing (lost) data packets of the reception window 304. No restriction is attached to the identifier of the data packets. For example, data packets can be identified by their respective sequence numbers.

Then, at step 210, a new timer value $T_{NACK}$ is drawn, for example in the range $[T_{Min}; T_{Max}]$, and, at step 211, the timer is re-armed. The method then goes back to step 200.

Figure 4:
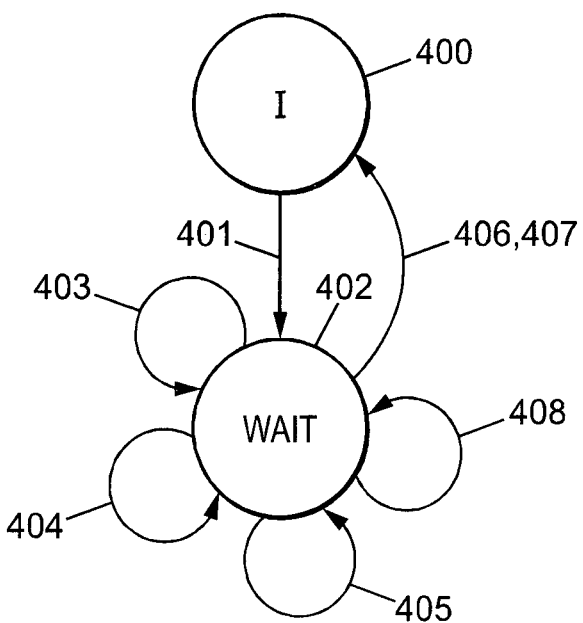
FIG. 4 is a flowchart illustrating the states of a timer of a multicast receiver according to some embodiments of the invention.

Activation and deactivation of the timer is summarized with reference to FIG. 4.

FIG. 4 is a flowchart illustrating the different states of a timer according to some embodiments of the invention.

In an initial state 400, no data packet is missing and the reception window 304 is empty. In the initial state, the timer is deactivated.

According to transition 401, a data packet loss is detected (or a loss of several data packets is detected). A counter indicating the number of missing data packets can then be incremented, a timer value $T_{NACK}$ is drawn, the timer is armed and a transition to a waiting state 402 is performed. Of course, creating a counter for counting the number of missing packets is optional, as the number of missing packets is accessible from the reception window 304, which is regularly updated.

In the waiting state 402, several transitions may happen.

According to transition 403, a new data packet loss is detected, the counter indicating the number of missing data packets is then incremented and the multicast receiver stays in the waiting state 402.

According to transition 404, a retransmitted data packet, which was missing in the reception window 304, is received, the reception window is updated, but the updated reception window 304 is not empty. The counter indicating the number of missing data packets is then decremented and the multicast receiver stays in the waiting state 402.

According to transition 405, the timer reaches the set timer value $T_{NACK}$. Then, the non-acknowledgment message is sent, a new timer value $T_{NACK}$ is drawn and the timer is rearmed. The multicast receiver stays in the waiting state 402.

According to transition 406, a retransmitted data packet which was missing in the reception window 304, is received, the reception window 304 is updated and the updated reception window 304 is empty. The multicast receiver then transitions from the waiting state 402 to the initial state 400.

According to transition 407, a discarding operation can be decided because timestamps of data packets located between the bottom of window 300 and the end of window 301 have elapsed. The reception window 304 is updated and becomes empty. The multicast receiver then transitions from the waiting state 402 to the initial state 400.

According to transition 408, a discarding operation is decided because timestamps of data packets located between the bottom of window 300 and a higher sequence number have elapsed, the higher sequence number being less than the end of window 301. The reception window 304 is updated by cancelling the data packets for which timestamps are elapsed, but the updated reception window 304 is not empty. The counter indicating the number of missing data packets is then decremented by the number of missing discarded packets and the multicast receiver stays in the waiting state 402.

When performing transitions 407 and 408, the discarded data packets can be transmitted to the application unit 16 or 17. Indeed, as previously explained, the application unit can implement resilient video or audio encoding and may use the available information even if some data packets are missing.

Then, the multicast receiver can try to resynchronize to a next intra coded video frame.

Figure 5:
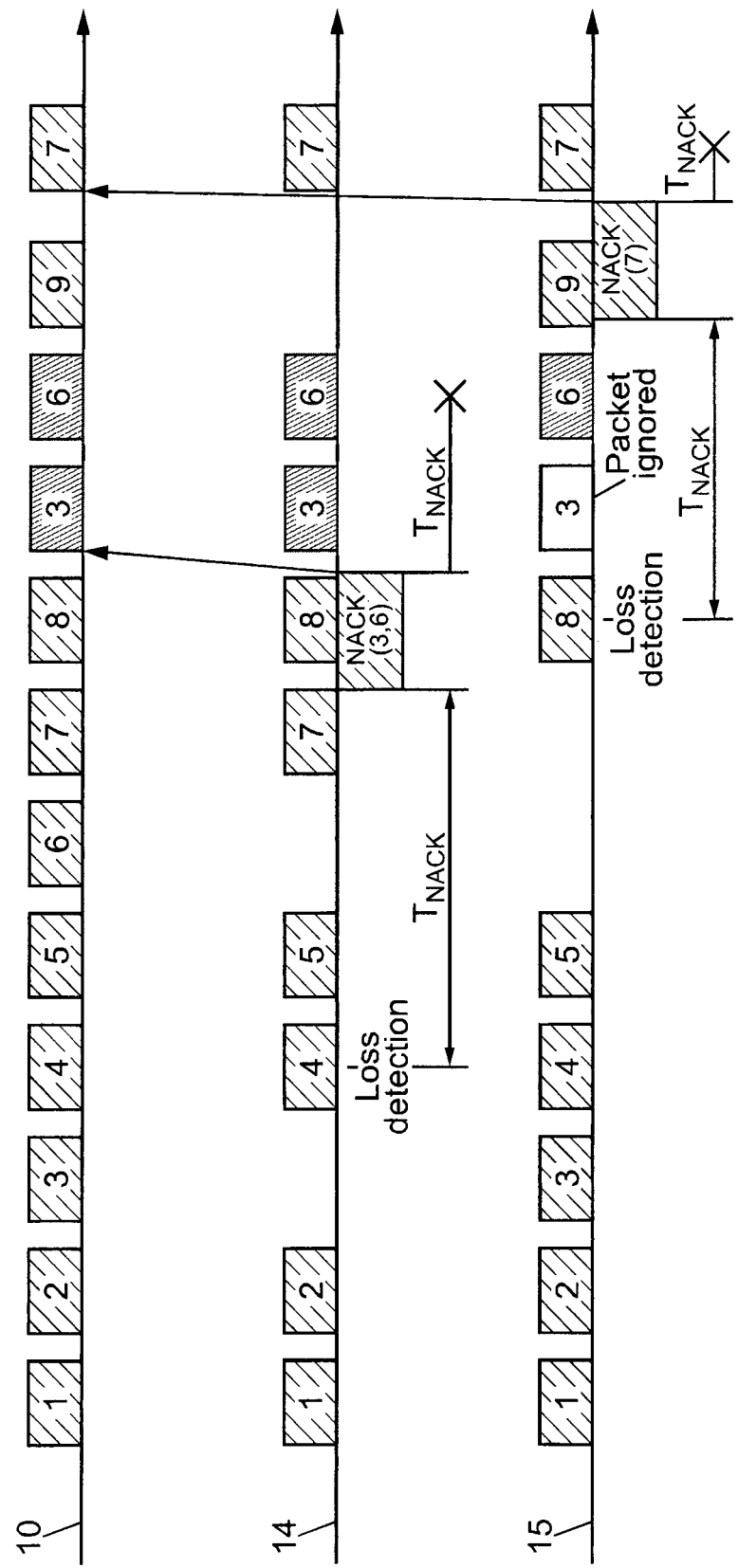
FIG. 5 is an exchange diagram for requesting retransmission of data packets according to some embodiments of the invention.

FIG. 5 is a timing diagram illustrating a method for requesting data packet retransmission according to some embodiments of the invention.

The timing diagram shows exchanges between the multicast transmitter 10, the first multicast receiver 14 and the second multicast receiver 15.

Data packets are identified by their respective sequence numbers.

Data packets 1 and 2 are correctly received by both the first multicast receiver 14 and the second multicast receiver 15. However, the first multicast receiver 14 does not receive data packet 3. Therefore, upon reception of the data packet 4, the first multicast receiver 14 detects that the data packet 3 is missing, and updates its reception window accordingly. The first multicast receiver 14 also draws a timer value and arms the timer.

The data packet 6 is not received by both first and second multicast receivers. The data packet 7 is not received by the second multicast receiver 15 only.

Upon reception of the data packet 7, the first multicast receiver 14 detects that the data packet 6 is lost, because data packet 7 is not contiguous to data packet 5 that has been previously transmitted to the application unit 16, and updates its reception window 304.

After the reception of the data packet 7, the timer of the first multicast receiver reaches the timer value TNACK, and therefore, an acknowledgment message identifying the missing data packets 3 and 6 is sent to the multicast transmitter 10.

The transmitter then retransmits data packets 3 and 6 on the multicast data link 18. Alternatively, and as explained hereafter, the data packets 3 and 6 can be sent to the first multicast receiver 14 only, via the unicast data link 19.1.

Upon reception of data packet 8, the second multicast receiver 15 detects that packets 6 and 7 have been lost, updates its reception window 304, draws a timer value $T_{NACK}$ and arms the timer.

Upon reception of packets 3 and 6, the first multicast receiver 14 updates its reception window. After receiving data packet 6, the reception window is empty and no more packets are missing in the first multicast receiver 14, which therefore deactivates its timer.

Data packet 3, which has been previously received by the second multicast receiver 15, can be ignored by the second multicast receiver 15.

During reception of data packet 9 by the second multicast receiver 15, the timer of the second multicast receiver 15 reaches the timer value $T_{NACK}$ and therefore, the second multicast receiver 15 sends a non-acknowledgment message to the multicast transmitter 10. Because formerly lost packet 6 has already been retransmitted by the multicast transmitter 10, the non-acknowledgment only comprises the identifier of the data packet 7. A new timer value is then drawn and the timer is re-armed (or re-initialized).

The data packet 7 is retransmitted by the multicast transmitter 10. Upon reception of data packet 7, the second multicast receiver 15 updates its reception window 304, which becomes empty, and then deactivates the timer.

Link problems can also exist on the uplink control links 21.1 and 21.2, and a non-acknowledgment message can be lost. However, the timer armed by the multicast receiver ensures that a new non-acknowledgment message will be transmitted in case some data packets are still missing after expiration of the timer.

In the embodiment shown on FIG. 5, upon reception of a non-acknowledgment message, the multicast transmitter 10 immediately transmits the identified data packets. However, in some embodiments, the retransmission(s) can be delayed, as it will be explained hereafter.

When a multicast receiver requests retransmission of a too old data packet in a NACK message, it is recommended that the multicast transmitter 10 sends a content information message on the multicast control link 20 to inform the multicast receivers 14 and 15 about the state of the transmission window.

Upon reception of this content information message, the multicast receiver 14 or 15 can decide to flush a part of its receiving window, by discarding some data packets, to move forward the bottom of window to a next recovery point indicated in the content information message. The next recovery point can for example be a data packet corresponding to an intra-coded frame, or can correspond to the bottom of window of the transmission window. This enables to cancel the delay accumulated, and enables to restart packet delivery without being continuously interrupted by new unrecovered errors.

The same flushing operation can also be executed by a multicast receiver 14 or 15 when it receives data packets that are out of its reception window. This case may occur when the window does not move forward because of successive errors on the packet located at the bottom of window.

As explained above, the timer value $T_{NACK}$ can be drawn in a range $[T_{Min}; T_{Max}]$.

The maximum value $T_{Max}$ can be set based on a difference between the Presentation Time Stamp (PTS) value of the frame carried by the data packet of the bottom of window, and the PTS of the currently played frame. Indeed, data packets can be stored in a video buffer (cache) of the application unit 16 or 17, and frames obtained from the data packets are played with a certain amount of delay by an audio/video decoder. This gives some time for the multicast receiver to receive data packets carrying the next audio/video frames.

Figure 6:
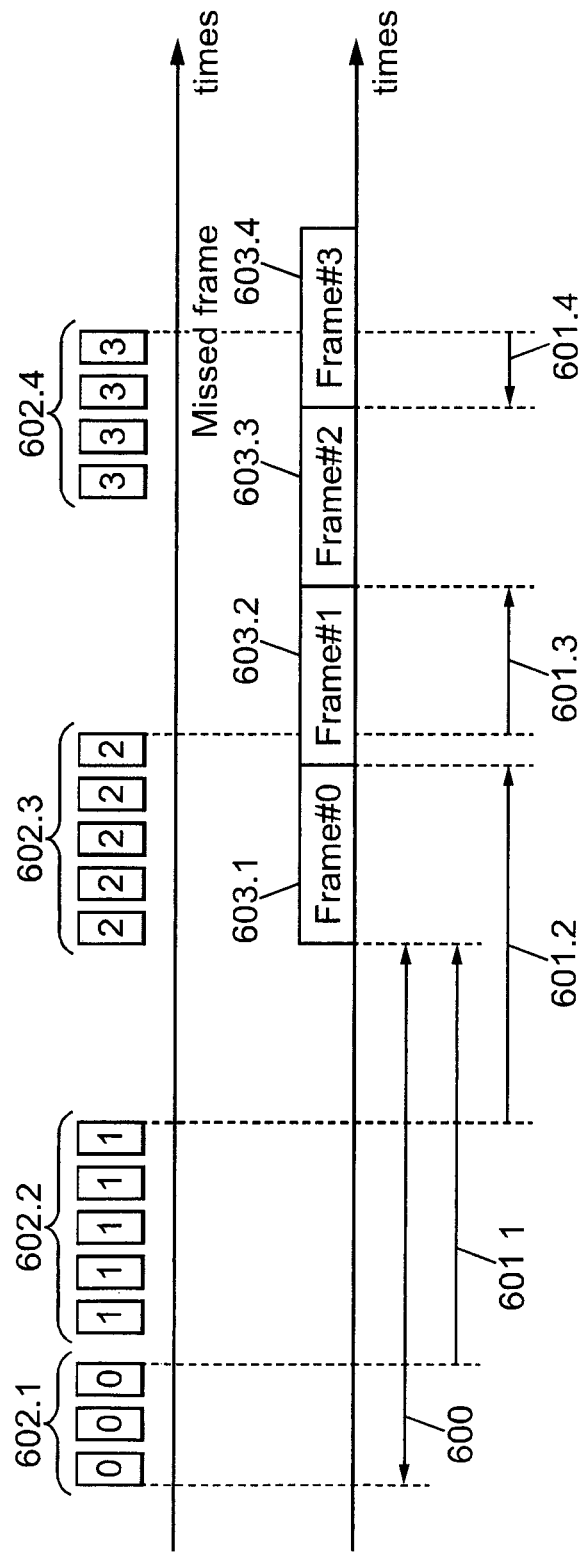
FIG. 6 is a timing diagram showing the packet reception and the display of frames carried by the received packets.

FIG. 6 illustrates two parallel timelines respectively showing receptions of data packets by the multicast receiver, and outputs on the decoder.

The time difference 600 between the reception of the first packet and the start of the video display corresponds to the video cache depth of the decoder.

The three data packets 602.1 carry the first frame 603.1, the five data packets 602.2 carry the second frame 603.2, the five data packets 602.3 carry the third frame 603.3 and the four packets 602.4 carry the fourth frame 603.4.

As shown on FIG. 6, the time differences 601.1 to 601.4 between the complete reception of the data packets carrying a given frame, and the display of the given frame, diminish until becoming negative, which means that the display of the fourth frame 603.4 has to be delayed.

To avoid this, the maximum value $T_{Max}$ is set as explained above.

The minimum value $T_{Min}$ can also be set by the multicast receiver so that at least the reception of several data packets are covered by the duration $T_{Min}$.

As the original audio/video content can be encoded using a variable bit rate, the inter-packet time, which is the time elapsed between the reception of two consecutive data packets, may be variable.

Consequently, the multicast receiver can maintain the mean inter-packet time of the last n received and consecutive data packets. The minimum value $T_{Min}$ can be calculated based on the mean inter-packet time. For example, it can be an integer multiple of the mean inter-packet time.

Further optional improvements of the method according to the invention are now described.

According to some embodiments, the multicast receiver can decide to send the non-acknowledgment message before the timer reaches the set timer value $T_{NACK}$.

For example, a filling ratio of the reception window and the mean size of data packet error bursts can be accurate indicators to detect single packet losses. The filling ratio of the reception window can be the ratio of the received data packets by the missing data packets, in the transmission window.

Therefore, when a single packet loss is detected, the timer value $T_{NACK}$ can be divided by a predetermined factor in order to accelerate transmission of non-acknowledgment messages.

Also, upon reception of a loss report message from the multicast transmitter, a packet missing list, which contains identifiers of data packets to be included in a next non-acknowledgment message to be sent, is adjusted so that data packets scheduled for multicast retransmission are not requested again by the multicast receiver. The packet missing list therefore corresponds to the lost packets of the reception window, without the lost data packets for which retransmission has already been requested.

For example, if the second multicast receiver 15 requests retransmission of a given data packet, the multicast transmitter 10 can multicast a loss report message indicating that the given data packet is going to be retransmitted in multicast mode. Therefore, even in the case where the first multicast receiver 14 also detects that the given data packet is lost, it does not include the identifier of the given data packet in the non-acknowledgment message, because it has already been requested for retransmission.

According to another embodiment, if the loss report message indicates retransmission of a given data packet in unicast mode (to another multicast receiver having requested retransmission), and if the multicast receiver determines that the given data packet belongs to the list of missing packets, then the multicast receiver immediately sends a non-acknowledgment message to request retransmission of the given packet, without waiting for the timer to reach the timer value $T_{NACK}$. This allows optimizing the unicast/multicast selection process into the transmitter, which enables to save some bandwidth resources.

According to some embodiments, the lost data packets requested in the non-acknowledgment messages can be ordered by the multicast receiver, depending on the type of audio/video frame they carry.

For example, based on the number of retransmitted data packets announced by the multicast transmitter in a loss report message, the multicast receiver may decide to limit the number of identifiers of lost data packets included in the non-acknowledgment message.

The data packets can be classified by priorities:
1) packets already announced to be retransmitted in unicast mode into one loss report message. Indeed, as explained above, in that case, the non-acknowledgment message can be sent without waiting for the timer to reach the timer value $T_{NACK}$;
2) packets carrying an intra-coded video frame or an audio frame;
3) packets carrying a video predictive frame;
4) packets carrying a video bi-predictive frame.

Among packets carrying predictive or bi-predictive frames, priority can be given to frames suffering the least data packet losses.

The above classification is given for illustrative purposes. Of course, the order of the packet types can be changed. For example, audio frames can be classified before or after packets carrying an intra-coded video frame.

The multicast receiver can deduce associations between packets and types of frames based on content information messages periodically sent by the multicast transmitter 10.

This enables to limit the number of retransmissions for the most important data packets. Indeed, the total number of retransmitted packets does not preferably exceed a given percentage of the stream average bandwidth (for example 10%) to preserve the system efficiency.

Also, data packets carrying an audio/video frame n with a $PTS_N$ that is too high compared to the $PTS_d$ of the currently decoded frame, is preferably not requested for retransmission by the multicast receiver. The Round Trip Time (RTT), the minimum time needed for retransmission $T_{RtxMin}$ (explained hereafter) and a time margin σ, can be considered to this end.

For example, the following formula can be applied to check whether a packet is eligible for retransmission:

$$PTS_N < PTS_d - T_{RtxMin} - RTT - σ.$$

Figure 7:
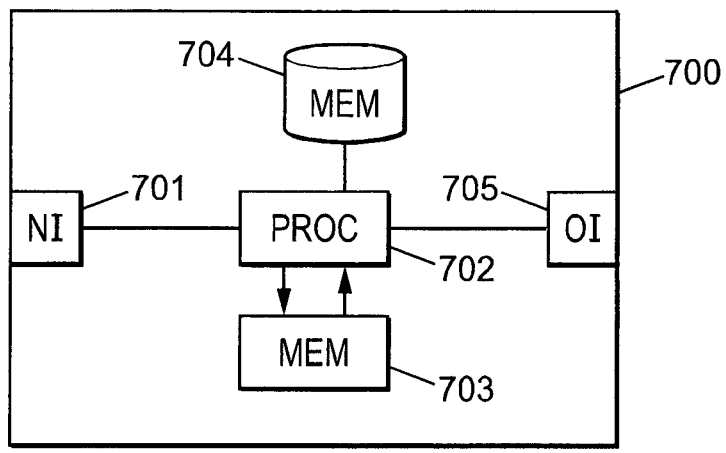
FIG. 7 shows the structure of a multicast receiver according to some embodiments of the invention.

FIG. 7 shows a multicast receiver 700 according to some embodiments of the invention. For example, the multicast receiver 700 can be the first multicast receiver 14 or the second multicast receiver 15.

The multicast receiver 700 comprises a random access memory 703 and a processor 702 that can store instructions for performing the steps of a method as described above when referring to FIGS. 2 and 4.

The multicast receiver 700 may also comprise a database 704 for storing data resulting from the method according to the invention. For example, the database 704 may store the reception window and optionally the missing data packet list.

The multicast receiver comprises a network interface 701 to communicate with the multicast transmitter 10. The network interface 701 can also be located in the station 12. In that case, the receiver 14 and the station 12 can be grouped together in the multicast receiver 700. The network interface 701 can be a wireless interface such as an IEEE 802.11 interface. The network interface 701 can receive data or control messages communicated by the network transmitter 10 on the links 18, 19 or 20. The network interface 701 can also transmit NACK messages to the network transmitter 10.

The multicast receiver 700 also comprises an output interface 705 to transmit in-order packets to the application unit and more generally to communicate with the application unit (for example to obtain the PTS of the currently played frame).

The retransmission carried out by the multicast transmitter 10 is now described.

As previously explained, the multicast transmitter 10 may periodically send a content information message on the multicast control link 20, to notify every multicast receiver 14 and 15 about the content carried by the multicast data packets. However, as the multicast control link 20 may be error-prone, it is useful to repeat the same content information message several times so that every multicast receiver can have access to the information carried by the content information message.

The loss report message (for example the TPLR message) can be emitted by the multicast transmitter 10 over the multicast control link 20 to notify every multicast receiver 14 and 15 about the data packets that are going to be retransmitted. The TPLR message is standardized in the RFC 6642. As mentioned above, the TPLR message can be extended to report the transmission mode (multicast or unicast) of each of the data packets scheduled for retransmission.

A timer value $T_{TPLR}$ and an associated transmitter timer can be used to manage the emission of TPLR messages. Upon reception of a NACK message over one of the unicast control channels 21.1 and 21.2, the multicast transmitter can update an internal list of data packets to be retransmitted, and can send a new TPLR message if the transmitter timer has reached the timer value $T_{TPLR}$.

The transmitter timer is then re-armed and the $T_{TPLR}$ is reset using a defined value. The multicast transmitter 10 waits for a minimum duration $T_{RtxMin}$ before effective retransmission of requested data packets.

This enables the multicast transmitter 10 to let the opportunity to any multicast receiver 14 and 15 to send an immediate NACK message upon reception of the TPLR message (for example if the TPLR message indicates scheduled unicast transmission of a given message, and if the given message is missing in the multicast receiver receiving the TPLR message).

When a data packet requested for retransmission belongs to a burst of errors (meaning that consecutive data packets are missing) or is requested by several multicast receivers, the multicast transmitter 10 can schedule retransmission of the data packet in multicast mode. Otherwise, the data packet can be scheduled to be retransmitted in unicast mode to the requesting multicast receiver.

When the multicast mode is used for retransmission, data packets can be multiplexed with data packets first transmitted in the in the same data flow in order to optimize the bandwidth usage at layer-2, as proposed in the TxOp mechanism introduced by the standard IEEE 801.11e.

Preferably, the multicast transmitter 10 may ensure that the total number of retransmitted data packets does not exceed a pre-determined threshold, which can be proportional to the media stream bitrate. Consequently, some requested data packets may not be retransmitted by the multicast transmitter 10.

The order in which the data packets are scheduled for retransmission:

data packets carrying a video intra-coded frame or an audio frame;
data packets carrying a video predictive frame;
data packets carrying a video bi-predictive frame.

Within a priority level, data packets can be ordered and retransmitted according to their respective sequence numbers.

Figure 8:
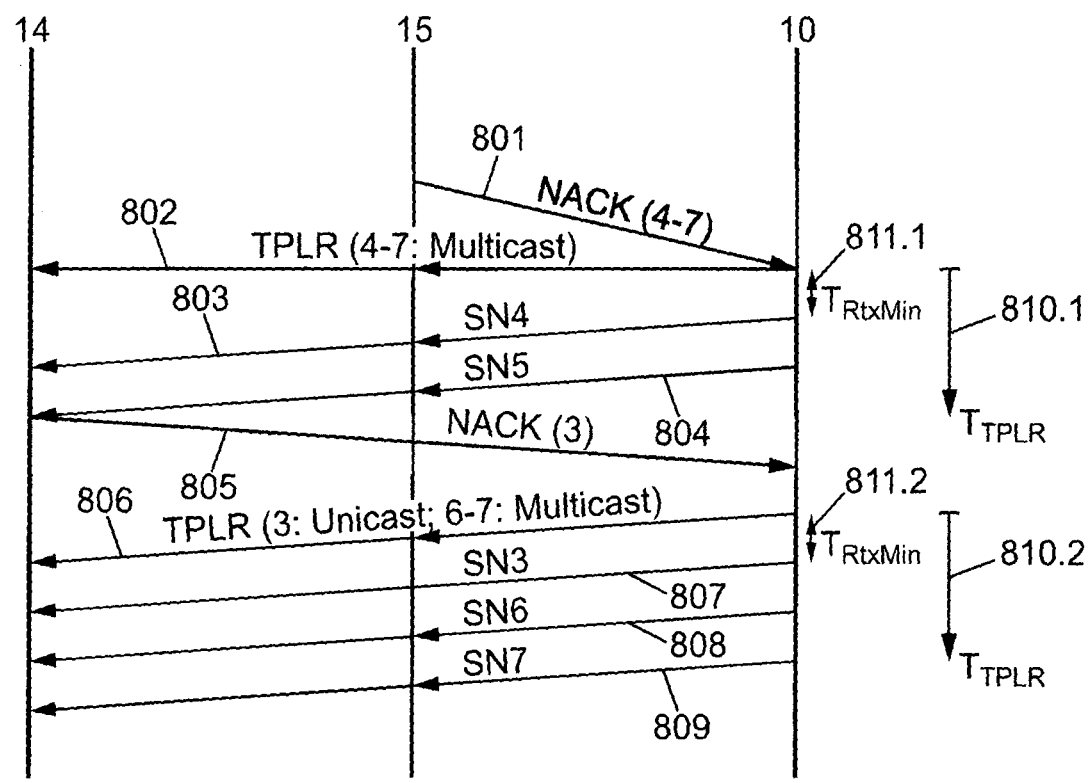
FIG. 8 is a diagram exchange illustrating a retransmission method according to some embodiments of the invention.

To illustrate this, FIG. 8 is a flowchart illustrating a retransmission method carried out by the multicast transmitter 10 according to a first example of the invention.

The first multicast receiver 14 is represented by its reference 14, the second multicast receiver 15 is represented by its reference 15 and the multicast transmitter 10 is represented by its reference 10.

At step 801, the second multicast receiver 15 requests retransmission of data packets 4 to 7 via a NACK message sent to the multicast transmitter 10.

Upon reception of the NACK message, the multicast transmitter selects a retransmission mode for the data packets 4 to 7. As lost data packets 4 to 7 correspond to a burst of errors, it can be decided to retransmit data packets 4 to 7 in multicast.

Then, a TPLR message is sent to all the multicast receivers on the multicast control link 20, the TPLR message indicating that retransmission in multicast of packets 4 to 7 has been scheduled.

In parallel to this, after emission of the TPLR message at step 802, the transmitter timer $T_{TPLR}$ is armed at step 810.1.

The multicast transmitter 10 also waits for a duration $T_{RtxMin}$ at step 811.1, before retransmitting the data packet 4 in multicast at step 803.

Then, the multicast transmitter 10 retransmits data packet 5 in multicast at step 804.

At step 805, the first multicast receiver 14 sends a NACK message to the multicast transmitter, requesting retransmission of packet 3.

The multicast transmitter 10 selects a retransmission mode for the data packet 3: for example unicast.

Because, in the meantime, the transmitter timer has expired (has reached the value $T_{TPLR}$), a new TPLR message is multicast at step 806 on the multicast control link 20, indicating that scheduled retransmissions of the data packet 3 is unicast and of the data packets 6 and 7 in multicast.

In parallel to this, after emission of the TPLR message at step 806, the transmitter timer is armed at step 810.2.

The multicast transmitter 10 also waits for a duration $T_{RtxMin}$ at step 811.2, before retransmitting the data packet 3 in unicast to the first multicast receiver 14 at step 807.

At step 808, the data packet 6 is retransmitted in multicast, and at step 809 the data packet 7 is retransmitted in multicast.

Figure 9:
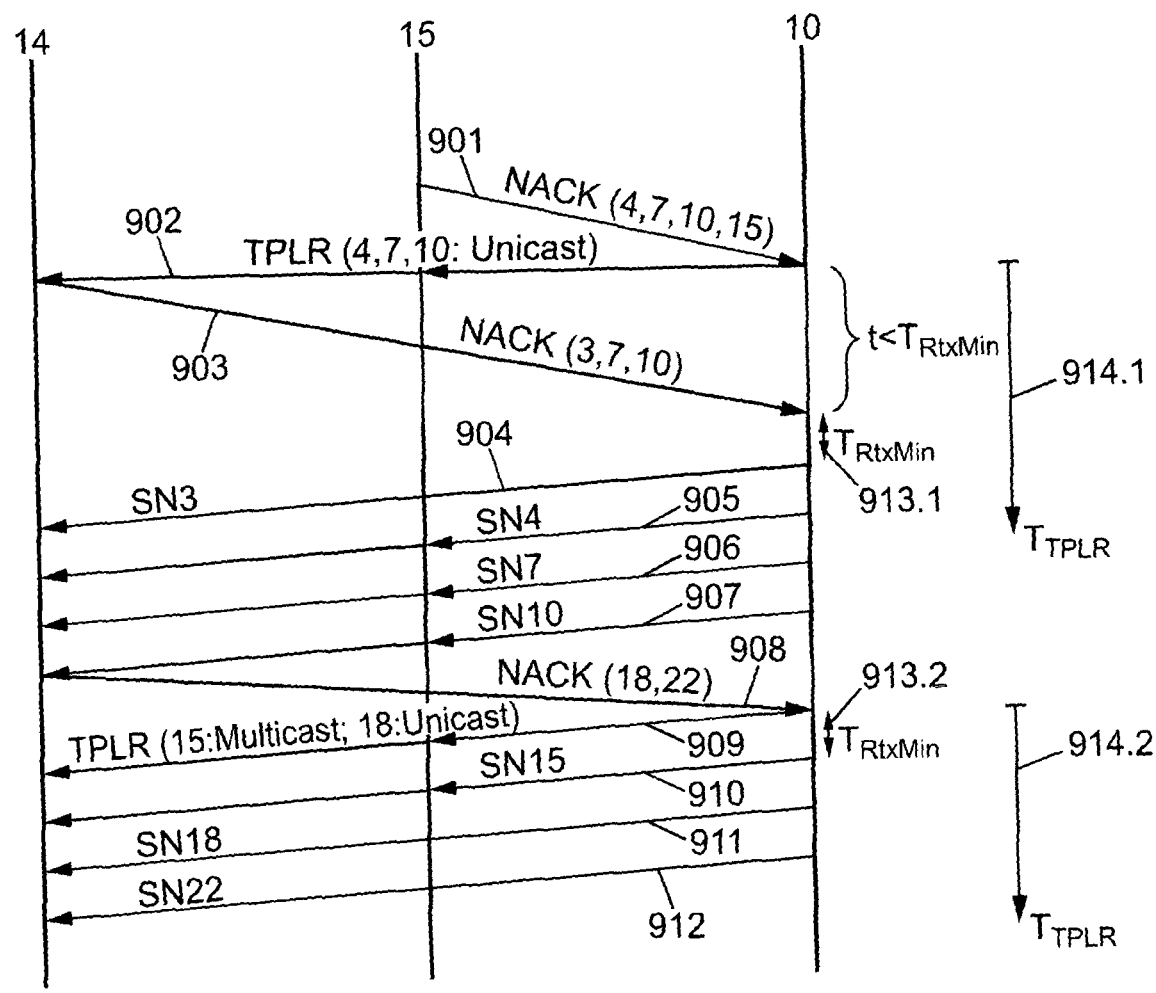
FIG. 9 is a diagram exchange illustrating a retransmission method according to some embodiments of the invention.

FIG. 9 is a flowchart illustrating a retransmission method carried out by the multicast transmitter 10 according to a second example.

Again, the first multicast receiver 14 is represented by its reference 14, the second multicast receiver 15 is represented by its reference 15 and the multicast transmitter 10 is represented by its reference 10.

At step 901, the second multicast receiver 15 requests retransmission of data packets 4, 7, 10 and 15 via a NACK message sent to the multicast transmitter 10.

Upon reception of the NACK message, the multicast transmitter selects a retransmission mode for data packets 4, 7, 10: as they do not correspond to a burst of errors and as they are requested by only one multicast receiver, the unicast mode is selected.

The multicast transmitter 10 then sends a TPLR message in multicast mode to all the receivers, indicating the data packets 4, 7 and 10 are going to be retransmitted in unicast mode. The multicast transmitter may also select a retransmission mode for data packet 15. For example, data packet 15 is scheduled to be retransmitted in multicast mode, for example because it carries a frame with a high priority.

Upon reception of the TPLR message, the first multicast receiver 14 sends a second NACK message to the multicast transmitter 10 requesting data packets 3, 7 and 10 for retransmission. The second NACK message is sent immediately after the TPLR message because the first multicast receiver is missing the data packets 7 and 10, and that these data packets are scheduled to be retransmitted in unicast mode only (to the requesting second multicast receiver 15).

Data packet 4 has not been retransmitted in the meantime because the time elapsed between reception of the first NACK message and the second NACK message is less than $T_{RtxMin}$.

In parallel to this, after emission of the TPLR message at step 902, the transmitter timer is armed at step 914.1. Because the timer has not expired when the second NACK message is receiver at step 903, a new TPLR message is not transmitted after step 903.

The multicast transmitter 10, upon reception of the second NACK message at step 903, waits for a duration $T_{RtxMin}$ at step 913.1, before retransmitting the data packet 3 in unicast to the first multicast receiver 14 at step 904.

At step 906, the data packet 7 is retransmitted in multicast mode to all the multicast receivers, because it has been requested for retransmission by at least two multicast receivers.

At step 907, the data packet 10 is retransmitted in multicast mode to all the multicast receivers, because it has been requested for retransmission by at least two multicast receivers.

At step 908, the first multicast receiver 14 sends a third NACK message to the multicast transmitter 10 requesting for retransmission of packets 18 and 22.

The multicast transmitter 10 selects a retransmission mode for the data packet 18 and 22: for example, the unicast mode.

Because, in the meantime, the transmitter timer has expired (has reached the value $T_{TPLR}$), a new TPLR message is multicast at step 909 on the multicast control link 20, indicating that scheduled retransmissions of the data packet 15 is multicast and of the data packets 18 and 22 is unicast.

In parallel to this, after emission of the TPLR message at step 909, the transmitter timer is armed at step 914.2.

The multicast transmitter 10 also waits for a duration $T_{RtxMin}$ at step 913.2, before retransmitting the data packet 15 in multicast at step 910.

At step 911, the data packet 18 is retransmitted in unicast to the first multicast receiver 14, and at step 912 the data packet 22 is retransmitted in unicast to the first receiver 14.

Figure 10:
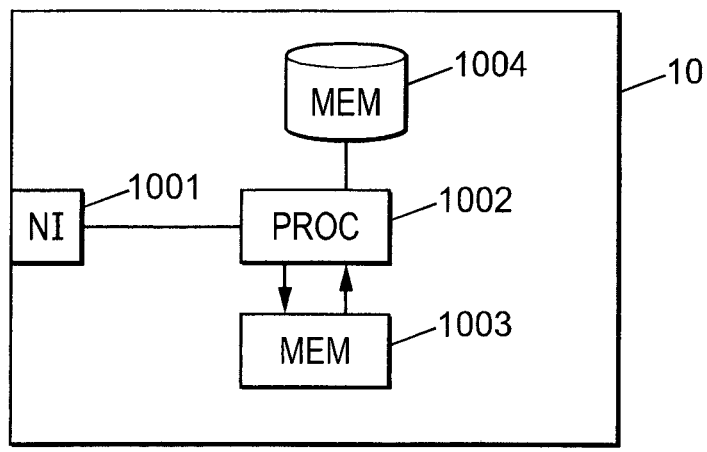
FIG. 10 is a detailed structure of a multicast transmitter according to some embodiments of the invention.

FIG. 10 illustrates a multicast transmitter 10 according to some embodiments of the invention.

The multicast transmitter 10 comprises a random access memory 1003 and a processor 1002 that can store instructions for performing the steps described above, in particular with reference to FIGS. 8 and 9.

The multicast transmitter 10 may also comprise a database 1004 for storing data resulting from the method according to the invention. For example, the database 1004 may store the transmission window.

The multicast transmitter 10 comprises a network interface 1001 to communicate with the multicast receivers. The network interface 1001 can also be located in the station 11. In that case, the station 11 can be integrated in the multicast transmitter 10. The network interface 1001 can be a wireless interface such as an IEEE 802.11 interface. The network interface 1001 can transmit data packets or control messages on the links 18, 19 or 20. The network interface 1001 can also receive NACK messages from the multicast receivers 14 and 15.

The present invention can also be embedded in a computer program product, which comprises all the features enabling the implementation of the methods described herein, and which, when loaded in an information processing system, causes the information processing system. Computer program means or computer program in the present context mean any expression, in any language, code or notation, of a set of instructions intended to cause a system having an information processing capability to perform a particular function either directly or after the conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

INDUSTRIAL APPLICABILITY

The method, the computer program product, the multicast receiver, and the system of this invention are applicable to multicast networks in many kinds of fields.

The invention claimed is:

1. A method of requesting retransmission of a lost data packet initially transmitted by a multicast transmitter in a network, the multicast transmitter multicasting data packets in the network, the method comprising:
upon detection of a loss of at least one data packet on a data link between the multicast transmitter and a first multicast receiver, setting a timer value and arming a timer;
upon detection that the timer reaches the set timer value, sending a non-acknowledgment message to the multicast transmitter via an uplink control link, the non-acknowledgment message comprising an identifier of at least one lost data packet, if it has not been previously retransmitted by the multicast transmitter and received by the first multicast receiver; and
receiving a loss report message on a multicast downlink control link from the multicast transmitter, the loss report message identifying data packets to be retransmitted by the multicast transmitter in association with a transmission mode among the unicast mode and the multicast mode,
wherein if a given data packet is identified to be retransmitted in multicast mode and if the given data packet belongs to the detected at least one lost data packet, then the non-acknowledgment message does not comprise the identifier of the given data packet, and
wherein if a given data packet is identified to be retransmitted in unicast mode and if the given data packet belongs to the detected at least one lost data packet, then the non-acknowledgment message at least comprising the identifier of the given data packet is transmitted to the multicast transmitter without waiting for the timer to reach the set timer value.

2. The method according to claim 1, wherein the data packets are ordered by sequence numbers and wherein the lost data packet is detected by receiving a data packet having a sequence number that is not contiguous with the highest sequence number of an already received packet.

3. The method according to claim 2, wherein the method comprises, maintaining a reception window having a bottom of window and an end of window, wherein the bottom of window is the lowest sequence number among sequence numbers of the at least one lost packets, wherein the end of window is the highest sequence number of an already received data packet plus one.

4. The method according to claim 3, wherein, upon reception of a first data packet having a sequence number corresponding to the bottom of window, the first data packet and received contiguous data packets are transmitted to an application unit and the bottom of window is updated.

5. The method according to claim 4, wherein if the bottom of window is equal to the end of window, the timer is deactivated.

6. The method according to claim 3, wherein the method comprises, upon detection of a loss of at least one data packet, determining whether the lost data packet is a single packet loss based on a filling ratio of the reception window and on respective states of preceding and next data packets, and wherein, upon determination of a single packet loss, the timer value is divided by a predetermined factor.

7. The method according to claim 3, wherein the non-acknowledgment message comprises identifiers of all the lost data packet or packets of the reception window.

8. The method according to claim 3, wherein the method further comprises, upon detection that a set of data packets of the reception window is associated with respective elapsed timestamps:
transmitting the set of data packets to an application unit;
discarding the set of data packets from the reception window, and
updating the reception window.

9. The method according to claim 1, wherein the timer value is randomly drawn in a range between a minimum value and a maximum value.

10. The method according to claim 9, wherein the minimum value is calculated based on a mean inter-packet time of n last data packets received, n being an integer greater than or equal to one.

11. The method according to claim 9, wherein the data packets are decoded to build video/audio frames and wherein the maximum value is set based on a difference between a first presentation timestamp value of a frame corresponding to the data packet of the bottom of window, and a second presentation timestamp value of a currently played frame.

12. The method according to claim 1, wherein the data packets are decoded to build video/audio frames and wherein the method further comprises receiving a content information message on a multicast downlink control link from the multicast transmitter, the content information message associating each data packet with a frame type of video/audio frame among the following types: intra-coded frame, audio frame, predictive coded frame, bi-predictive coded frame;
  wherein for each lost packet among the at least one detected lost packet, the associated frame type is determined by the multicast receiver based on the content information message;
  wherein the lost data packets identified in the non-acknowledgment message are prioritized based on their respective associated frame types.

13. A non-transitory computer readable medium having stored thereon instructions which when executed by a processor, causes the processor to perform a method of requesting retransmission of a lost data packet initially transmitted by a multicast transmitter in a network, the multicast transmitter multicasting data packets in the network, the processor performs processes of,
  upon detection of a loss of at least one data packet on a data link between the multicast transmitter and a first multicast receiver, setting a timer value and arming a timer;
  upon detection that the timer reaches the set timer value, sending a non-acknowledgment message to the multicast transmitter via an uplink control link, the non-acknowledgment message comprising an identifier of at least one lost data packet, if it has not been previously retransmitted by the multicast transmitter and received by the first multicast receiver; and
  receiving a loss report message on a multicast downlink control link from the multicast transmitter, the loss report message identifying data packets to be retransmitted by the multicast transmitter in association with a transmission mode among the unicast mode and the multicast mode,
  wherein if a given data packet is identified to be retransmitted in multicast mode and if the given data packet belongs to the detected at least one lost data packet, then the non-acknowledgment message does not comprise the identifier of the given data packet, and
  wherein if a given data packet is identified to be retransmitted in unicast mode and if the given data packet belongs to the detected at least one lost data packet, then the non-acknowledgment message at least comprising the identifier of the given data packet is transmitted to the multicast transmitter without waiting for the timer to reach the set timer value.

14. A multicast receiver for requesting retransmission of a lost data packet initially transmitted by a multicast transmitter in a network, the multicast transmitter multicasting data packets in the network, the multicast receiver comprising:
  a processor to execute a programs; and
  a memory to store the program which, when executed by the processor, performs processes of,
  detecting loss of at least one data packet on a data link between the multicast transmitter and the multicast receiver,
  upon detection of the loss, setting a timer value and arming a timer;
  after the timer reaches the set timer value, sending a non-acknowledgment message to the multicast transmitter via a network interface of the multicast receiver and on an uplink control link, the non-acknowledgment message comprising an identifier of at least one lost data packet, if it has not been previously retransmitted by the multicast transmitter and received by the multicast receiver; and
  receiving a loss report message on a multicast downlink control link from the multicast transmitter, the loss report message identifying data packets to be retransmitted by the multicast transmitter in association with a transmission mode among the unicast mode and the multicast mode;
  wherein if a given data packet is identified to be retransmitted in multicast mode and if the given data packet belongs to the detected at least one lost data packet, then the non-acknowledgment message does not comprise the identifier of the given data packet, and
  wherein if a given data packet is identified to be retransmitted in unicast mode and if the given data packet belongs to the detected at least one lost data packet, then the non-acknowledgment message at least comprising the identifier of the given data packet is transmitted to the multicast transmitter without waiting for the timer to reach the set timer value.

15. A system comprising at least one multicast receiver according to claim 14 and a multicast transmitter.

* * * * *